United States Patent
Wang et al.

(10) Patent No.: US 10,852,439 B1
(45) Date of Patent: Dec. 1, 2020

(54) GLOBAL IONOSPHERIC TOTAL ELECTRON CONTENT PREDICTION SYSTEM

(71) Applicant: Beihang University, Beijing (CN)

(72) Inventors: Zhipeng Wang, Beijing (CN); Cheng Wang, Beijing (CN); Kaiyu Xue, Beijing (CN); Kun Fang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/930,741

(22) Filed: Jul. 16, 2020

(30) Foreign Application Priority Data

Apr. 30, 2020 (CN) .......................... 2020 1 0361063

(51) Int. Cl.
| | |
|---|---|
| *G01S 19/07* | (2010.01) |
| *G01W 1/10* | (2006.01) |
| *G06N 3/08* | (2006.01) |
| *G06N 3/04* | (2006.01) |

(52) U.S. Cl.
CPC ............. *G01S 19/072* (2019.08); *G01W 1/10* (2013.01); *G06N 3/0445* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 6,167,247 A | * | 12/2000 | Kannell ................... | H03C 1/06 455/295 |
| 6,205,400 B1 | * | 3/2001 | Lin ....................... | G01C 21/165 342/357.31 |

(Continued)

OTHER PUBLICATIONS

Senzhang Wang, Deep Learning for Spatio-Temporal Data Mining: A Survey, 21 pages, Jun. 23, 2019 (Year: 2019).*

(Continued)

*Primary Examiner* — Tung S Lau
(74) *Attorney, Agent, or Firm* — Locke Lord LLP; Tim Tingkang Xia, Esq.

(57) ABSTRACT

The present invention provides a global ionospheric total electron content prediction system based on a spatio-temporal sequence hybrid framework. The prediction system implements computational processing for two types of spatio-temporal sequences, wherein for a stationary spatio-temporal sequence, a STARMA model prediction method is constructed in the present invention; for a non-stationary spatio-temporal sequence, a nonlinear spatio-temporal trend is firstly extracted from the non-stationary spatio-temporal sequence by adopting a ConvLSTM method until the extracted residual passes a stationarity test, and then the electron content is predicted using the STARMA model prediction method. By using a parallel computing method in the present invention, the computational efficiency can be greatly improved, and the operation time can be saved; meanwhile, the global ionospheric electron content distribution characteristics are fully considered, so that the ionospheric prediction algorithm itself is more in line with the space weather law and has a higher prediction accuracy.

7 Claims, 3 Drawing Sheets

(56) References Cited

U.S. PATENT DOCUMENTS

| | | | |
|---|---|---|---|
| 6,246,960 B1* | 6/2001 | Lin | G01C 21/165 |
| | | | 701/472 |
| 7,096,121 B2* | 8/2006 | Intriligator | G01W 1/10 |
| | | | 702/3 |
| 10,551,505 B2* | 2/2020 | Memarzadeh | G01S 19/07 |
| 2006/0229813 A1* | 10/2006 | Tobiska | G01W 1/10 |
| | | | 702/2 |
| 2013/0021201 A1* | 1/2013 | del Castillo | G01S 19/071 |
| | | | 342/357.59 |
| 2019/0129038 A1* | 5/2019 | Goeltner | G08G 1/005 |

OTHER PUBLICATIONS

Yuan Yunbin, Monitoring the ionosphere based on the Crustal Movement Observation Network of China, 8 pages, Apr. 11, 2015 (Year: 2015).*

Tae San Kim, Graph convolutional network approach applied to predict hourly bike-sharing demands considering spatial, temporal, and global effects, 16 pages, Sep. 16, 2019 (Year: 2019).*

Claudio Cesaroni, Neural network based model for global Total Electron Content Forecasting, 18 pages, Mar. 6, 2020 (Year: 2020).*

* cited by examiner

GLOBAL IONOSPHERIC TOTAL ELECTRON CONTENT PREDICTION SYSTEM

CROSS-REFERENCE TO RELATED PATENT APPLICATION

This non-provisional application claims priority to and the benefit of, pursuant to 35 U.S.C. § 119(a), patent application Serial No. CN202010361063.5 filed in China on Apr. 30, 2020. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present invention relates to the technical field of ionospheric detection and communication, and in particular to a global ionospheric total electron content prediction system based on a spatio-temporal sequence hybrid framework.

BACKGROUND

With the wide application of a global satellite navigation system in many fields, such as surveying and mapping exploration, resource investigation, space atmosphere research, etc., positioning services with an ordinary precision have been difficult to meet the needs of users with the need of a high precision. Among many factors that affect the positioning accuracy of a satellite navigation system, the positioning error caused by ionospheric delay can reach tens of meters to hundreds of meters, which is an important factor that cannot be ignored in the process of positioning calculation.

Ionosphere is generally an upper atmosphere 60-1000 km from the ground, which is partially ionized by external high-energy rays to generate a large number of electrons and positive ions. The existence of this area has a great influence on the signal propagation transmitted by the satellite navigation system, which results in the change of the propagation speed and propagation path of satellite navigation signals. Especially in the single-frequency precise point positioning technology, since the error caused by ionospheric delay will directly affect the accuracy of final positioning, in practical application, an ionospheric model is generally selected to obtain the electron content and make corresponding corrections to obtain the final positioning result. Ionospheric models that are commonly used include Bent model, International Reference Ionosphere (IRI) model, Klobuchar model, etc. However, due to the limitations of the current research theory of space ionosphere, the empirical model cannot obtain accurate electron content, and its accuracy is generally only 60%~70%, which is difficult to meet the requirements of single-frequency receiving users. At the same time, with the construction of global satellite navigation systems, a large number of dual-frequency observation data can be obtained, and a measured electron content model can be constructed by using these actual observation data. At present, commonly used ionospheric electron content models include ionospheric electron content grid products provided by International GNSS Service (IGS), grid products provided by the data processing center CODE of IGS using a spherical harmonic model, and so on. By dividing the whole world into different grids according to certain rules, the above ionospheric electron content products are finally generated by calculating and retrieving the electron content in different regions, which provides data support for realizing high-precision positioning and space weather research.

Although the global ionospheric electron content grid products can provide high-precision data of electron content, it is difficult to realize real-time data calculation because of its complex calculation and large amount of data. Therefore, how to accurately predict based on the historical data of electron content in practical applications has become the key to the development of single frequency positioning. At present, the commonly used global ionospheric electron content prediction methods generally regard the electron content as an ordered time sequence, and the time characteristics (time memory ability) of the electron content can be effectively extracted by adopting the analysis method in time sequence analysis, so that ideal prediction results can be obtained. However, the grid products are divided manually, which often ignores the fact that the ionosphere, as a space weather phenomenon, also has its own unique spatial distribution characteristics, resulting in the separation of the temporal and spatial characteristics of electron content in prediction.

SUMMARY

In order to make up for various shortcomings of the current research in global electronic content prediction algorithms in the prior art, the present invention provides a global ionospheric total electron content prediction system based on a spatio-temporal sequence hybrid framework, wherein, the system comprises a transmitting station, a space station and a receiver;

the transmitting station is configured to predict a global ionospheric total electron content and transmit a result of the predicted global ionospheric total electron content to the space station;

the space station comprises a plurality of satellites for receiving information of the predicted global ionospheric total content and broadcasting the received information of the predicted global ionospheric total content to a global receiver;

the receiver is configured to receive the information of the predicted global ionospheric total content sent by the space station, and eliminate an error caused by an ionosphere changing a propagation speed and a propagation path of satellite navigation signals according to the information;

wherein, the transmitting station implements computational processing for two types of spatio-temporal sequences, the first being a stationary spatio-temporal sequence and the second being a non-stationary spatio-temporal sequence;

in a case of a stationary spatio-temporal sequence, a STARMA model prediction method is directly used, and the STARMA model prediction method comprises the following steps of:

step one, establishing a STARMA model of the stationary spatio-temporal sequence, wherein, firstly, the STARMA model is established and identified: an objective function of the STARMA model is firstly established, and then autocorrelation and partial correlation functions of the STARMA model are used to perform model identification and determine a function order; secondly, model parameters of the STARMA model are estimated; step two, checking a residual of the STARMA model after the model is established; step three, estimating a precision of the predicted result of the model by using a root mean square error (RMS) and an average error (Bias);

in a case of a non-stationary spatio-temporal sequence, a ConvLSTM+STARMA hybrid model prediction method is used, which comprises the following steps of:

step one, establishing a hybrid model comprising a model portion A and a model portion B, wherein firstly, the model portion A is to extract a spatial nonlinear trend of the non-stationary spatio-temporal sequences by using Convolutional Neural Networks, extract a temporal nonlinear trend of the non-stationary spatio-temporal sequence by using a LSTM neural network, and obtain a non-linear trend model of the non-stationary spatio-temporal sequence by the two extraction; secondly, a nonlinear trend in data is obtained using the model portion A, the nonlinear trend in the data is removed to obtain residual data, and a stationarity test is carried out on the obtained residual data; if the test fails, the model portion A is readjusted to extract the nonlinear trend again until the residual data pass the stationarity test; and thirdly, the model portion B is to perform STARMA modeling on stationary residual data if the test is passed;

step two, performing a residual test on a fitting result of the hybrid model; and step three, after passing the residual test, predicting the global ionospheric total electron content using the hybrid mode, and evaluating the prediction accuracy of the predicted result using the root mean square error (RMS) and average error (Bias).

Furthermore, preprocessing of original data and checking of stationarity of original electronic content data are performed before predicting the stationary spatio-temporal sequence;

the preprocessing of the original data is as follows: grid electron content observation data are used as the original data, and corresponding preprocessing is carried out in a preparation stage to judge whether there are abnormal data in the original data, and if so, the abnormal data need to be eliminated, because the abnormal data may be electron content values far exceeding a normal range caused by a low quality of original electron content data during calculation, and the abnormal data are atypical, rare and wrong calculated values, and will lead to deviation of results when participating in modeling;

the method used in the stationarity test of the original electron content data is to use a spatio-temporal covariance function of sample data for the stationarity test, and the formula of the stationarity test is as follows:

$$\gamma_{k+h} = \frac{1}{kh}\left[\sum_{i}^{h}\sum_{t}^{k}(z_i(t) - \mu_{z_i(t)})\right]\left[\sum_{i}^{h}\sum_{t}^{k}(z_{i+m}(t+k) - \mu_{z_i(t)})\right]$$

wherein, $r_{h+k}$ indicates a sample covariance function, $z_i(t)$ indicates a temporal sequence, $\mu_{z_i(t)}$ indicates a mean value of the temporal sequence, k is a time delay, and h is a space delay.

Furthermore, a criterion for the stationarity test is that when the time delay k and the space delay h take different values, if the obtained sample covariance remains unchanged or changes slowly, then the stationarity test is passed.

Furthermore, the STARMA model prediction method specifically comprises the following steps of:

Step 1: establishing a stationary spatio-temporal sequence STARMA model;

wherein, after the stationarity test of the original electron content data, if it is confirmed to be a stationary spatio-temporal sequence, the STARMA model can be used for modeling, and the specific steps of modeling are as follows:

(1) establishment and identification of the STARMA model: firstly, an objective function of that STARMA model is established, and the formula of the objective function is:

$$z(t) = \sum_{k=1}^{p}\sum_{h=0}^{m_k}\varphi_{kh}w^{(h)}z(t-k) - \sum_{l=1}^{q}\sum_{h=0}^{n_l}\theta_{kh}w^{(h)}\varepsilon(t-1) + \varepsilon(t)$$

wherein, z(t) is an observed value t=0, 1, 2, ... n at time t in an electron content sequence;

k=1, 2, ... p, which is the time delay;

h=0, 1, 2, ... n, which is the space delay;

$w^{(h)}|$ is a spatial weight matrix of order h, which represents a quantitative measure of spatial proximity, in which case, a reciprocal of distance square is used as a weight value for measurement and a sum of each row of the weight matrix itself is standardized as 1, h=0, 1, 2, ... n;

$\varphi_{kh}$ and $\theta_{kh}$ represent an autoregressive coefficient and a sliding coefficient respectively;

$\varepsilon(t)$ represents a white noise sequence with a mean value of zero and a variance of $\delta^2$, where t=0, 1, 2, ... n;

then, the autocorrelation and partial correlation functions of the STARMA model are used to perform model identification and determine the function order; on the one hand, q and p in STARMA model objective function formula are determined as time characteristics, and on the other hand, $m_k$ and $n_l$ in the STARMA model objective function formula are determined as space characteristics, and q, p, $m_k$ and $n_l$ are collectively referred to as an undetermined order; in time sequence analysis, memory characteristics of the time sequence are analyzed by using autocorrelation and partial correlation functions of the time sequence, and similarly, for the spatio-temporal sequence, a spatio-temporal sequence autocorrelation function is introduced, and the formula of the spatio-temporal sequence autocorrelation function is as follows:

$$\hat{\rho}_h(k) = \frac{T}{T-K}\frac{\sum_{i=1}^{N}\sum_{t=1}^{T-K}[w^{(h)}z_i(t)][w^{(0)}z_i(t+k)]}{\sqrt{\sum_{i=1}^{N}\sum_{t=1}^{T-k}[w^{(h)}z_i(t)]^2\sum_{i=1}^{N}\sum_{t=1}^{T-k}[w^{(0)}z_i(t)]^2}}$$

wherein, T is a total amount of samples; k is the time delay; h is the space delay;

$w^{(h0}$ is a spatial weight matrix with a space delay period of h, and a spatial weight matrix with a space delay of 0 when h=0 is a unit matrix, because every point in the space is its own neighborhood of order 0;

by analogy with the time sequence, a Yule-Walker equation is obtained by spatial autocorrelation function analysis, and the partial correlation function of spatio-temporal sequence is obtained by solving the equation; the Yule-Walker of the spatio-temporal sequence is as follows:

$$\hat{p}_h(k) = \sum_{l=1}^{p}\sum_{h=1}^{n_k} \phi_{kh}\hat{p}_{h-l}(t)$$

$\hat{p}_h$ (k) is a spatio-temporal autocorrelation coefficient, t is the time delay, h is the space delay, ρ is a maximum time delay, $n_k$ is a maximum space delay of a sample when the time delay is k, $\phi_{kh}$ represents a spatio-temporal partial correlation function of the sample, l represents a delay value of 0, 1, 2, . . . h, and the corresponding spatio-temporal partial correlation function is obtained by solving the above equations, and the correlation between $z_{i\ h}$ (t) and $z_i$ (t k) is obtained by obtaining the partial correlation function $\phi_{kh}$;

by analyzing a tail or a truncation of the spatial autocorrelation and partial correlation functions on the data of electron content, a specific value of the undetermined order in the formula of the spatio-temporal sequence autocorrelation function is obtained;

(2) model parameters of the STARMA model are estimated

φ, θ and δ in the objective function of the STARMA model are called as model parameters, in view of the two dimensions of time and space involved in spatio-temporal sequence analysis, if a least square method is used to estimate the model parameters, parameter results obtained when estimating the sliding parameter are unbiased but not effective, therefore, a method of maximum likelihood estimation is chosen when estimating the model parameters;

assuming a random error term ε(0, σ² $I_{N\ T}$) in an original observation sequence of electron content, a parameter likelihood function in the spatio-temporal sequence of electron content can be obtained b joint distribution of the error term, as shown in the following formula:

$$L(\varepsilon \mid \varphi, \theta, \sigma^2) = (2\pi)^{-TN/2}(\sigma^2)^{-TN/2}e^{\left(\frac{-s(\varphi,\theta)}{2\sigma^2}\right)}$$

wherein, $$s(\varphi, \theta) = \sum_{i=1}^{N}\sum_{t=1}^{T}\varepsilon_i(t)^2,$$

by transforming the above formula into a logarithmic form, and taking partial derivatives of φ, θ and δ respectively, a uniformly optimal unbiased estimation of the spatio-temporal sequence of electron content can be obtained;

step two: checking a residual of the STARMA model after the model is established after the establishment of the STARMA model, a model suitable for the stationary spatio-temporal sequence can be obtained, but it is still necessary to check whether the residual of the STARMA models is a random error, that is, whether a fitting residual of the model meets the requirements of a mean value of zero, a covariance of zero and a variance matrix of $\delta I_N$; if the above requirements are met, it shows that the STARMA model can reflect the electron content data to a great extent; otherwise, there is still a certain correlation and variability in time and space, and non-stationary time-space sequence modeling is needed.

Furthermore, the spatio-temporal sequence autocorrelation function measures the degree of correlation of a sample value corresponding to time t in an area formed by the time delay k and the space delay h, and a value range thereof is [−1, 1], and the closer the value is to 1, the higher the degree of correlation between time sequences of the samples.

Furthermore, the process of extracting the spatial nonlinear trend of the non-stationary spatio-temporal sequence by using Convolutional Neural Networks is as follows:

the spatial nonlinear trend of the global electron content sequence is extracted by a convolution neural network, which is composed of five basic structures: an input layer, a convolution layer, a pooling layer, a fully connected layer and an output layer;

as an input of the whole neural network, the input layer generally receives three-dimensional data input, which are longitude, latitude and electron content respectively, and three-dimensional data are transmitted between different layers of the convolutional neural network;

the convolution layer, as a core part of neural network processing, is mainly used for feature extraction of electronic content data; the convolution layer has three important parameters: convolution kernel size, convolution step size and filling mode, which play a decisive role in a size of a feature map output by the convolution layer; the convolution kernel size is related to complexity of spatial characteristics, the larger a convolution kernel, the more complex features can be extracted; the convolution step size is similar to a spatial weight matrix of different orders, representing a distance between positions of input pictures processed by two adjacent convolution kernels; there are two filling modes: using filling and not using filling; the difference between the two different filling modes lies in that the size of an output picture changes after convolution, and complex characteristics are expressed by activation functions in the convolution layer; commonly used activation functions include a hyperbolic tangent function (tan h), an exponential linear unit, etc.; after convolution of input three-dimensional electron content data with a convolution kernel, a characteristic map of electron content distribution can be obtained by the activation functions, and spatial characteristics can be extracted in this process, and the spatial characteristics can be used as a prediction basis;

the pooling layer accepts an output of the convolution layer, and continues to reduce a resolution of the feature map obtained by the convolution layer, which can effectively reduce the parameters in the fully connected layer and prevent the occurrence of model overfitting;

the fully connected layer is located behind the convolution layer and the pooling layer, and after the input three-dimensional data passes through multiple convolution layers and pooling layers, low-order features of data spatial characteristics are gradually extracted, and high-order characteristics of data can be obtained through combination, and then a final classification result is given by connecting with the fully connected layer;

the output layer can take different outputs according to different requirements, such as outputting classification labels for image classification and identifying a size and a category of an output object;

the specific process of extracting the temporal nonlinear trend of the non-stationary spatio-temporal sequence by a LSTM neural network is as follows:

the method of extracting the temporal nonlinear trend of a global electronic content sequence by using the LSTM neural network is characterized in that, a long-term observation data can be efficiently used to extract the temporal nonlinear trend of the model, a structure of a "forgetting gate" is introduced into the LSTM neural network, and by setting a weight matrix of the "forgetting gate", an output of neurons at a previous moment and an input at a current moment collectively determine what information in the neurons at the last moment can remain in the current neurons, which can overcome the shortcoming of poor learning effect of early data characteristics of general circulating neural networks; a common LSTM circulating neural network includes four layers of interactive neural networks, and the relationship between networks is expressed by the following formula:

$$i_t \sigma(W_{xi} X_t W_{hi} h_{t-1} b_i)$$

$$f_t \sigma(W_{xf} X_t W_{hf} h_{t-1} b_f)$$

$$o_t \sigma(W_{xo} X_t W_{ho} h_{t-1} b_o)$$

$$= S \circ S \ S \circ S S S h \ S \ h \ S$$

$$h = S \circ S S S h$$

wherein, $i_t$ represents a result of an input gate; $f_t$ represents a result of a forget gate; $o_t$ represents a result of an output gate; $S_t$ represents an output at the time T and also represents a long-term memory; $h_t$ represents a short-term memory, and W and b respectively represent different weight coefficients and offsets;

extraction of the temporal nonlinear trend of electronic content by the LSTM neural network is embodied in that the input gate, the forget gate and the output gate will be collectively determined by an input state $X_t$ at the current moment and a state $S_{t-i}$ at the previous moment; use of the forget gate and the input gate determines retention and forgetting of information in the time sequence, and effectively preserves the long-term memory.

Furthermore, the step of estimating a precision of the predicted result of the model by using a root mean square error (RMS) and an average error (Bias) is specifically as follows:

in order to evaluate the prediction result, the average error (Bias) and the root mean square error (RMS) between a predicted value $VTEC^i_p$, and an actual observed value $VTEC^i_f$ are usually used for judgment by the following formula:

bais $$bais = \frac{1}{n} \sum_{i=1}^{n} (VTEC^i_p - VTEC^i_f)$$

$$RMS = \sqrt{\frac{\sum_{i=1}^{n}(VTEC^i_f - VTEC^i_r)^2}{n}}.$$

It should be understood that both the foregoing general description and the following detailed description are exemplary illustrations and explanations, and should not be used as limitations on what is claimed in the present invention.

Compared with the prior art, the method has the advantages that the global ionospheric electron content distribution characteristics are fully considered, so that the ionospheric prediction algorithm is more in line with the space weather law; for stationary spatio-temporal sequences, the STARMA model algorithm is constructed for prediction; for the actual global ionospheric electron content, because it is non-stationary spatio-temporal training, therefore, firstly, a ConvLSTM deep learning network is used to remove the non-linear definite trend in non-stationary spatio-temporal sequence, and when it is stationary, a STARMA model algorithm is used. The ConvLSTM algorithm is more accurate than general time sequence analysis methods in extracting the time characteristics of the sequence, and the STARMA model algorithm extracts the spatial characteristics of random spatio-temporal variation, which can improve the accuracy of prediction algorithm. Using the two parallel computing methods can greatly improve computing efficiency and save computing time.

BRIEF DESCRIPTION OF DRAWINGS

Further objects, functions and advantages of the present invention will be elucidated by the following description of embodiments of the present invention with reference to the accompanying drawings, in which.

DETAILED DESCRIPTION

Figure 1:
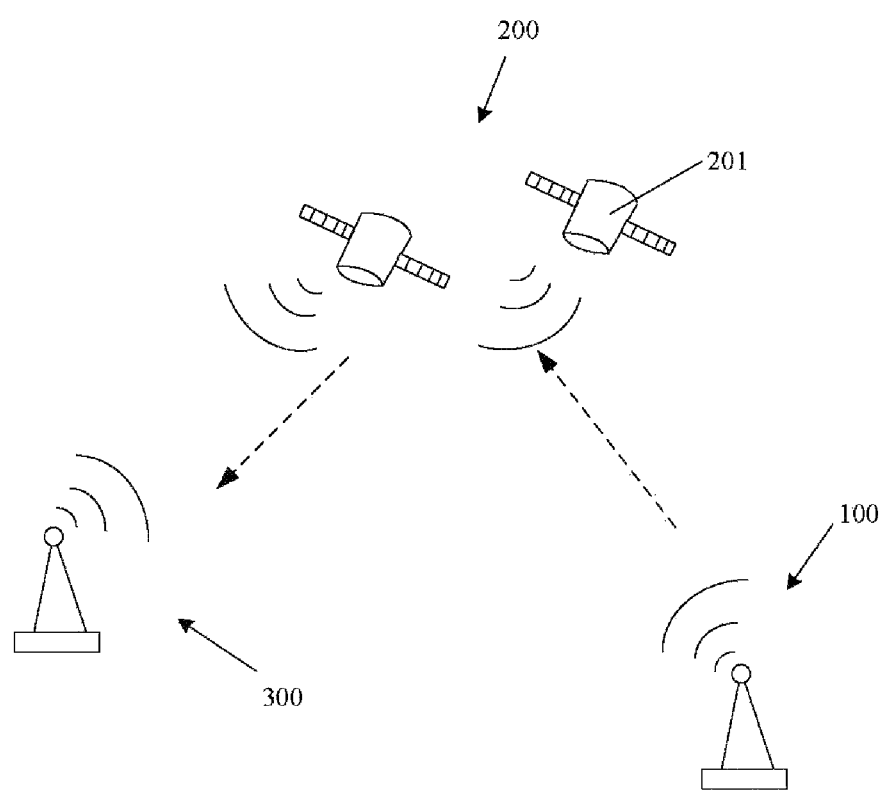
FIG. 1 is an overall schematic diagram of the global ionospheric total electron content prediction system of the present invention.

By referring to exemplary embodiments, the objects and functions of the present invention and methods for achieving these objects and functions will be elucidated. However, the present invention is not limited to the exemplary embodiments disclosed below. It can be realized in different forms. The essence of the description is only to help those skilled in the art comprehensively understand the specific details of the invention.

As used herein, the mathematic symbol "a" represents the Hadamard product, which is a binary operation that takes two matrices A and B of the same dimensions and produce another matrix of the same dimension as the operands, where each element i, j is the product of elements i, j of the original two matrices A and B. In other words, $(A \circ B)_{ij} = (A)_{ij} (B)_{ij}$.

Hereinafter, embodiments of the present invention will be described with reference to the drawings. In the drawings, the same reference numerals represent the same or similar components, or the same or similar steps.

Embodiments

Ionosphere is generally an upper atmosphere 60~1000 km from the ground, which is partially ionized by external high-energy rays to generate a large number of electrons and positive ions. The existence of this area has a great influence on the signal propagation transmitted by the satellite navigation system, which results in the change of the propagation speed and propagation path of satellite navigation signals. Especially in the single-frequency precise point positioning technology, since the error caused by ionospheric delay will directly affect the accuracy of final positioning, in practical application, an ionospheric model is generally selected to obtain the electron content and make corresponding corrections to obtain the final positioning result.

In order to solve the technical problem of low accuracy of ionospheric electron total content prediction in the prior art, the present invention provides a global ionospheric total electron content prediction system based on a spatio-temporal sequence hybrid framework. A global ionospheric total electron content prediction system based on a spatio-temporal sequence hybrid framework according to an embodiment of the present invention comprises a transmitting station 100, a space station 200 and a receiver 300;

the transmitting station 100 is configured to predict a global ionospheric total electron content and transmit a result of the predicted global ionospheric total electron content to the space station 200;

the space station 200 comprises a plurality of satellites 201 for receiving information of the predicted global ionospheric total content and broadcasting the received information of the predicted global ionospheric total content to a global receiver 300; the receiver 300 may be a receiver of a user on the ground or a on-board receiver of a plane;

the receiver 300 is configured to receive the information of the predicted global ionospheric total content sent by the space station 200, and eliminate an error caused by an ionosphere changing a propagation speed and a propagation path of satellite navigation signals according to the information; the specific process of adjusting the error is not limited in the present invention, and a person skilled in the art may make adjustment according to the existing methods.

According to the embodiment of the present invention, the global ionospheric electron total amount is predicted in the transmitting station (computer/processor/programmable integrated circuit of the transmitting station), which will be explained in details below.

Figure 2:
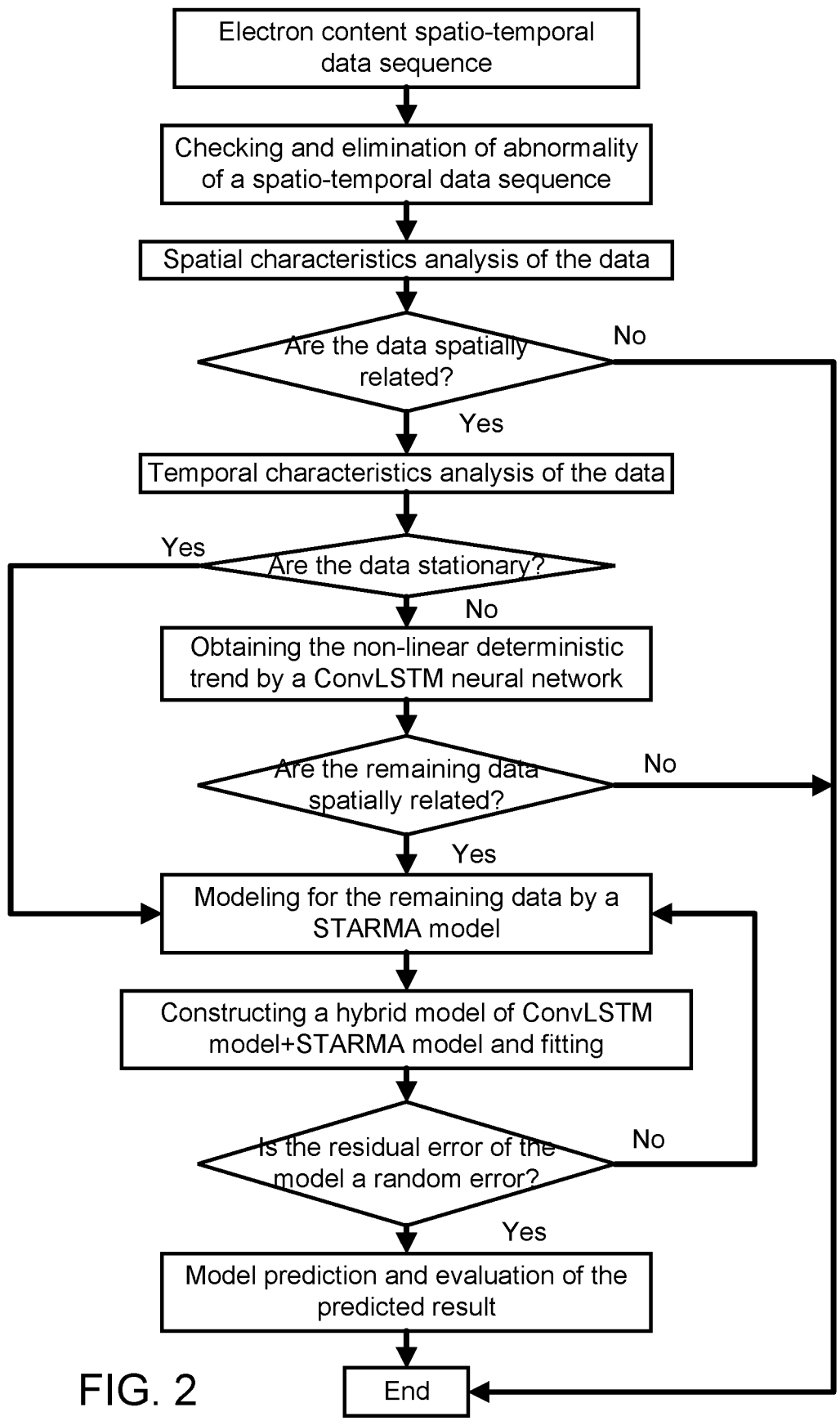
FIG. 2 is a flow chart of an electron content prediction algorithm based on a spatio-temporal sequence hybrid framework in an embodiment of the present invention.

This embodiment provides a global ionospheric total electron content prediction algorithm based on a spatio-temporal sequence hybrid framework. As shown in FIG. 2, the algorithm is based on the spatio-temporal sequence hybrid framework mechanism, and extracts the spatio-temporal characteristics of global ionospheric electron content by using stationary and accurate time sequences of electron content and combining with geographical modeling method, so as to improve the accuracy of existing ionospheric prediction products. The prediction method is as follows:

In this embodiment, the original data source of modeling is the post calculation ionospheric grid product of IGS Center. In order to obtain the relevant information of ionospheric space physics by using the measured data of the global satellite navigation system, the GS Center specially set up relevant working groups and data processing departments, and officially provided the global ionospheric grid electronic content product since 1998, which is a post calculation ionospheric product based on a large number of observed data and truly reflect the spatial-temporal distribution of the ionosphere.

The prediction method calculates and processes two types of spatio-temporal sequences, the first is stationary spatio-temporal sequence and the second is non-stationary spatio-temporal sequence;

in a case of a stationary spatio-temporal sequence, a STARMA model prediction method is directly used, and the STARMA model prediction method comprises the following steps of: step one, establishing a STARMA model of the stationary spatio-temporal sequence, wherein, firstly, the STARMA model is established and identified: an objective function of the STARMA model is firstly established, and then autocorrelation and partial correlation functions of the STARMA model are used to perform model identification and determine a function order; secondly, model parameters of the STARMA model are estimated; step two, checking a residual of the STARMA model after the model is established; step three, estimating a precision of the predicted result of the model by using a root mean square error (RMS) and an average error (Bias);

in a case of a non-stationary spatio-temporal sequence, a ConvLSTM+STARMA hybrid model prediction method is used, which comprises the following steps of:

step one, establishing a hybrid model comprising a model portion A and a model portion B, wherein firstly, the model portion A is to extract a spatial nonlinear trend of the non-stationary spatio-temporal sequences by using Convolutional Neural Networks, extract a temporal nonlinear trend of the non-stationary spatio-temporal sequence by using a LSTM neural network, and obtain a non-linear trend model of the non-stationary spatio-temporal sequence by the two extraction; secondly, a nonlinear trend in data is obtained using the model portion A, the nonlinear trend in the data is removed to obtain residual data, and a stationarity test is carried out on the obtained residual data; if the test fails, the model portion A is readjusted to extract the nonlinear trend again until the residual data pass the stationarity test; and thirdly, the model portion B is to perform STARMA modeling on stationary residual data if the test is passed;

step two, performing a residual test on a fitting result of the hybrid model; and step three, after passing the residual test, predicting the global ionospheric total electron content using the hybrid mode, and evaluating the prediction accuracy of the predicted result using the root mean square error (RMS) and average error (Bias).

I. Preprocessing of Original Data

Grid electron content observation data are used as the original data, and corresponding preprocessing is carried out in a preparation stage to judge whether there are abnormal data in the original data, and if so, the abnormal data need to be eliminated, because the abnormal data may be electron content values far exceeding a normal range caused by a low quality of original electron content data during calculation, and the abnormal data are atypical, rare and wrong calculated values, and will lead to deviation of results when participating in modeling.

II. Stationarity Test for Original Electronic Content Data

The obtained original electronic content data should be tested for stationarity, because the general electronic content products cover the whole world, the data conditions of different grid points are often different, so it is necessary to judge its stationarity according to different data, and implement modeling according to different stationarity. Generally, the spatio-temporal covariance function of sample data is used for stationarity test, and the stationarity test formula is as follows:

$$\gamma_{k+h} = \frac{1}{kh}\left[\sum_{i}^{h}\sum_{t}^{k}(z_i(t) - \mu_{z_i(t)})\right]\left[\sum_{i}^{h}\sum_{t}^{k}(z_{i+m}(t+k) - \mu_{z_i(t)})\right] \quad (1)$$

wherein, $r_{h+k}$ indicates a sample covariance function, $z_i(t)$ indicates a temporal sequence, $\mu_{z_i(t)}$ indicates a mean value of the temporal sequence, k is a time delay, and h is a space delay.

Figure 3:
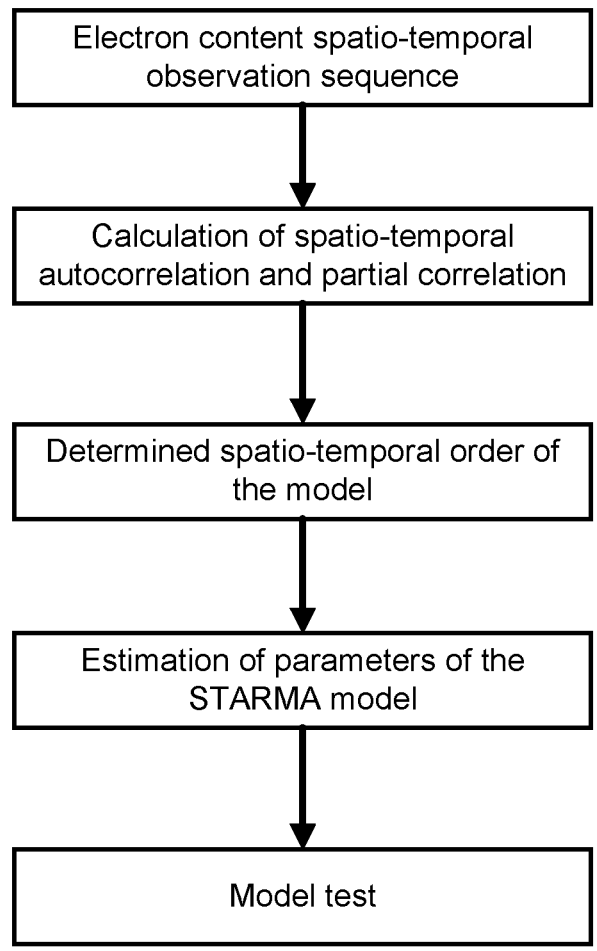
FIG. 3 is a processing flow chart of a STARMA model prediction method in an embodiment of the present invention.

III. STARMA Model Prediction Method for Stationary Spatio-Temporal Sequences 1. Establishing a stationary spatio-temporal sequence STARMA model After the stationarity test of the original electron content data, if it is confirmed to be a stationary spatio-temporal sequence, the STARMA model can be used for modeling. FIG. 3 is a processing flow chart of the STARMA model prediction method in the embodiment of the present invention, and the specific steps of modeling are as follows:

(1) An Objective Function of that STARMA Model is Established

The objective function of that STARMA model is:

$$z(t) = \sum_{k=1}^{p} \sum_{h=0}^{m_k} \varphi_{kh} w^{(h)} z(t-k) - \sum_{l=1}^{q} \sum_{h=0}^{n_l} \theta_{lh} w^{(h)} \varepsilon(t-1) + \varepsilon(t) \quad (2)$$

wherein, z(t) is an observed value t=0, 1, 2, . . . n at time t in an electron content sequence;

k=1, 2, . . . p, which is the time delay;

h=0, 1, 2, . . . n, which is the space delay;

$w^{(h)}$ is a spatial weight matrix of order h, which represents a quantitative measure of spatial proximity, in which case, a reciprocal of distance square is used as a weight value for measurement and a sum of each row of the weight matrix itself is standardized as 1, h=0, 1, 2, . . . n;

$\varphi_{kh}$ and $\theta_{kh}$ represent an autoregressive coefficient and a sliding coefficient respectively;

ε(t) represents a white noise sequence with a mean value of zero and a variance of $\delta^2$, where t=0, 1, 2, . . . n;

(2) The Function Order of the STARMA Model is Determined

The function order of the STARMA model is determined; on the one hand, q and p in STARMA model objective function formula are determined as time characteristics, and on the other hand, $m_k$ and $n_l$ in the STARMA model objective function formula are determined as space characteristics, and q, p, $m_k$ and $n_l$ are collectively referred to as an undetermined order; in time sequence analysis, memory characteristics of the time sequence are analyzed by using autocorrelation and partial correlation functions of the time sequence, and similarly, for the spatio-temporal sequence, a spatio-temporal sequence autocorrelation function is introduced, and the formula of the spatio-temporal sequence autocorrelation function is as follows:

$$\hat{\rho}_h(k) = \frac{T}{T-K} \frac{\sum_{i=1}^{N} \sum_{t=1}^{T-K} [w^{(h)} z_i(t)][w^{(0)} z_i(t+k)]}{\sqrt{\sum_{i=1}^{N} \sum_{t=1}^{T-k} [w^{(h)} z_i(t)]^2 \sum_{i=1}^{N} \sum_{t=1}^{T-k} [w^{(0)} z_i(t)]^2}} \quad (3)$$

wherein, T is a total amount of samples; k is the time delay; h is the space delay;

$w^{(h)}$ is a spatial weight matrix with a space delay period of h, and a spatial weight matrix with a space delay of 0 when h=0 is a unit matrix, because every point in the space is its own neighborhood of order 0.

The spatio-temporal sequence autocorrelation function measures the degree of correlation of a sample value corresponding to time t in an area formed by the time delay k and the space delay h, and a value range thereof is [−1, 1], and the closer the value is to 1, the higher the degree of correlation between time sequences of the samples.

By analogy with the time sequence, a Yule-Walker equation is obtained by spatial autocorrelation function analysis, and the partial correlation function of spatio-temporal sequence is obtained by solving the equation; the Yule-Walker of the spatio-temporal sequence is as follows:

$$\hat{\rho}_h(k) = \sum_{t=1}^{\rho} \sum_{h=1}^{n_k} \phi_{kh} \hat{\rho}_{h-l}(t) \quad (4)$$

$\hat{\rho}_h$ (k) is a spatio-temporal autocorrelation coefficient, t is the time delay, h is the space delay, ρ is a maximum time delay, $n_k$ is a maximum space delay of a sample when the time delay is k, $\phi_{kh}$ represents a spatio-temporal partial correlation function of the sample, l represents a delay value of 0, 1, 2, . . . h, and the corresponding spatio-temporal partial correlation function is obtained by solving the above equations, and the correlation between $z_{i,h}$ (t) and $z_i$(t k) is obtained by obtaining the partial correlation function $\phi_{kh}$. By analyzing a tail or a truncation of the spatial autocorrelation and partial correlation functions on the data of electron content, a specific value of the undetermined order in the formula (2) is obtained.

(3) Model Parameters of the STARMA Model are Estimated

φ, θ and δ in the objective function of the STARMA model are called as model parameters, in view of the two dimensions of time and space involved in spatio-temporal sequence analysis, if a least square method is used to estimate the model parameters, parameter results obtained when estimating the sliding parameter are unbiased but not effective, therefore, a method of maximum likelihood estimation is chosen when estimating the model parameters.

Assuming a random error term ε (0, (3, $\sigma^2 I_{N\ T}$) in an original observation sequence of electron content, a parameter likelihood function in the spatio-temporal sequence of electron content can be obtained b joint distribution of the error term, as shown in the following formula:

$$L(\varepsilon | \varphi, \theta, \sigma^2) = (2\pi)^{-TN/2} (\sigma^2)^{-TN/2} e^{\left(\frac{-s(\varphi,\theta)}{2\sigma^2}\right)} \quad (5)$$

wherein, $$s(\varphi, \theta) = \sum_{i=1}^{N} \sum_{t=1}^{T} \varepsilon_i(t)^2,$$

by transforming the above formula into a logarithmic form, and taking partial derivatives of φ, θ and δ respectively, a uniformly optimal unbiased estimation of the spatio-temporal sequence of electron content can be obtained.

2. Checking a Residual of the STARMA Model

After the establishment of the STARMA model, a model suitable for the stationary spatio-temporal sequence can be obtained, but it is still necessary to check whether the residual of the STARMA models is a random error, that is, whether a fitting residual of the model meets the requirements of a mean value of zero, a covariance of zero and a variance matrix of $\delta I_N$; if the above requirements are met, it shows that the STARMA model can reflect the electron content data to a great extent; otherwise, there is still a certain correlation and variability in time and space, and non-stationary time-space sequence modeling is needed.

In this embodiment, exploratory spatial data analysis (ESDA) is adopted to judge the spatial stationarity of STARMA model. Through the ESDA method, relevant analysis such as data histogram, normal QQ diagram and semivariable function diagram can be obtained to judge the spatial characteristics, so as to determine the spatial stability of the STARMA model. The determination of the temporal stationarity of the STARMA model is analyzed by D-W test (Dubin-Watson test) in economics.

II. ConvLSTM+STARMA Modeling for Non-Stationary Spatio-Temporal Sequences

The ionosphere is located between troposphere and atmospheric magnetosphere, and its distribution is complex, and it is coupled with both troposphere and magnetosphere, especially it is more obviously affected by solar activity. Its distribution characteristics have the following two features:

(1) when the solar activity is low and the physical characteristics of space atmosphere are stationary, the electron content sequence is weakly stationary, while when the solar activity is high or there are spatial anomalies such as magnetic storms, the electron content shows extremely high non-stationarity and generally shows weak non-stationarity;

(2) Considering spatial factors, the spatio-temporal sequence of electron content shows a strong spatial heterogeneity and nonlinear trend with the rotation of the earth and the movement of the direct point of the sun, that is, the non-stationary sequence in space.

In this embodiment, for the above-mentioned characteristics of the spatio-temporal non-stationary sequence, its change trend is decomposed into: a long-time stable spatio-temporal variation μ and a local short-time random spatio-temporal variation e, where μ is usually related to time and position, and e is a spatio-temporal correlation error with a mean value of zero, indicating a small-scale random spatio-temporal variation.

For the specific global electronic content sequence, firstly, the ConvLSTM neural network is used to extract the spatial nonlinear trend of the global electronic content sequence; then, ConvLSTM neural network is used to extract the temporal nonlinear trend of global electron content sequence; next, the remaining residual data after extracting the spatio-temporal nonlinear trend is tested for stationarity; then, the residual data is tested for stationarity; if the data pass the stationarity test, the STARMA model prediction method of stationary spatio-temporal sequence is used to predict the residual data; if the residual data fails the stationarity test, the ConvLSTM neural network training structure should be adjusted until the residual data are stationary; finally, the prediction results of STARMA model are evaluated. The specific process is as follows:

1. The spatial nonlinear trend of the global electron content sequence is extracted by a ConvLSTM neural network In this embodiment, The spatial nonlinear trend of the global electron content sequence is extracted by a Convolutional Neural Network (CNN), which is composed of five basic structures: an input layer, a convolution layer, a pooling layer, a fully connected layer and an output layer;

as an input of the whole neural network, the input layer generally receives three-dimensional data input, which are longitude, latitude and electron content respectively, and three-dimensional data are transmitted between different layers of the convolutional neural network;

the convolution layer, as a core part of neural network processing, is mainly used for feature extraction of electronic content data; the convolution layer has three important parameters: convolution kernel size, convolution step size and filling mode, which play a decisive role in a size of a feature map output by the convolution layer; the convolution kernel size is related to complexity of spatial characteristics, the larger a convolution kernel, the more complex features can be extracted; the convolution step size is similar to a spatial weight matrix of different orders, representing a distance between positions of input pictures processed by two adjacent convolution kernels; there are two filling modes: using filling and not using filling; the difference between the two different filling modes lies in that the size of an output picture changes after convolution, and complex characteristics are expressed by activation functions in the convolution layer; commonly used activation functions include a hyperbolic tangent function (tan h), an exponential linear unit, etc.; after convolution of input three-dimensional electron content data with a convolution kernel, a characteristic map of electron content distribution can be obtained by the activation functions, and spatial characteristics can be extracted in this process, and the spatial characteristics can be used as a prediction basis;

the pooling layer accepts an output of the convolution layer, and continues to reduce a resolution of the feature map obtained by the convolution layer, which can effectively reduce the parameters in the fully connected layer and prevent the occurrence of model overfitting;

the fully connected layer is located behind the convolution layer and the pooling layer, and after the input three-dimensional data passes through multiple convolution layers and pooling layers, low-order features of data spatial characteristics are gradually extracted, and high-order characteristics of data can be obtained through combination, and then a final classification result is given by connecting with the fully connected layer;

the output layer can take different outputs according to different requirements, such as outputting classification labels for image classification and identifying a size and a category of an output object.

2. The temporal nonlinear trend of the non-stationary spatio-temporal sequence is extracted by a ConvLSTM neural network In this embodiment, the temporal nonlinear trend of the non-stationary spatio-temporal sequence is extracted by a LSTM neural network, which is characterized in that: a long-term observation data can be efficiently used to extract the temporal nonlinear trend of the model, a structure of a "forgetting gate" is introduced into the LSTM neural network, and by setting a weight matrix of the "forgetting gate", an output of neurons at a previous moment and an input at a current moment collectively determine what information in the neurons at the last moment can remain in the current neurons, which can overcome the shortcoming of poor learning effect of early data characteristics of general circulating neural networks; a common LSTM circulating neural network includes four layers of interactive neural networks, and the relationship between networks is expressed by the following formula:

$$i_t \sigma(W_{xi} X_t W_{hi} h_{t-1} b_i) \tag{6}$$

$$f_t \sigma(W_{xf} X_t W_{hf} h_{t-1} b_f) \tag{7}$$

$$o_t \sigma(W_{xo} X_t W_{ho} h_{t-1} b_o) \tag{8}$$

$$o_o hh \tag{9}$$

$$h = S_o SSSh \tag{10}$$

wherein, $i_t$ represents a result of an input gate; $f_t$ represents a result of a forget gate; $o_t$ represents a result of an output gate; $S_t$ represents an output at the time T and also represents a long-term memory; $h_t$ represents a short-term memory, and W and b respectively represent different weight coefficients and offsets;

extraction of the temporal nonlinear trend of electronic content by the LSTM neural network is embodied in that the input gate, the forget gate and the output gate will be collectively determined by an input state $X_t$ at the current moment and a state $S_{t-1}$ at the previous moment; use of the forget gate and the input gate determines retention and forgetting of information in the time sequence, and effectively preserves the long-term memory.

3. Prediction of residual data by a STARMA model

For non-stationary ionospheric electron content spatio-temporal data, a ConvLSTM deep learning network is generally used to extract its spatio-temporal nonlinear trend, and then the residual data are tested for stationarity. If it passes the stationarity test, the STARMA model prediction method for the stationary spatio-temporal sequence is used to predict the residual data. If the residual data fail the stationarity test, the training structure of a ConvLSTM neural network should be adjusted until the residual data are stationary.

4. Evaluation of the prediction result of STARMA model

Temporal and spatial distribution characteristics of electronic content can be obtained by modeling the global electronic content in time and space, and a more important role is to make high-precision prediction through available ionospheric observation data. In order to evaluate the prediction result, the average error (Bias) and the root mean square error (RMS) between a predicted value $VTEC^i_p$ and an actual observed value $VTEC^i_f$ are usually used for judgment by the following formula:

$$bais = \frac{1}{n}\sum_{i=1}^{n}(VTEC^i_p - VTEC^i_f) \tag{11}$$

$$RMS = \sqrt{\frac{\sum_{i=1}^{n}(VTEC^i_f - VTEC^i_r)^2}{n}} \tag{12}$$

Combined with the description and practice of the invention disclosed herein, other embodiments of the invention will be easily conceived and understood by those skilled in the art. The description and examples are to be regarded as exemplary only, and the true scope and spirit of the invention are defined by the claims.

What is claimed is:

1. A global ionospheric total electron content prediction system based on a spatio-temporal sequence hybrid framework, wherein, the system comprises a transmitting station, a space station and a receiver;

the transmitting station is configured to predict a global ionospheric total electron content and transmit a result of the predicted global ionospheric total electron content to the space station;

the space station comprises a plurality of satellites for receiving information of the predicted global ionospheric total content and broadcasting the received information of the predicted global ionospheric total content to a global receiver;

the receiver is configured to receive the information of the predicted global ionospheric total content sent by the space station, and eliminate an error caused by an ionosphere changing a propagation speed and a propagation path of satellite navigation signals according to the information;

wherein, the transmitting station implements computational processing for two types of spatio-temporal sequences, including a stationary spatio-temporal sequence and a non-stationary spatio-temporal sequence;

in a case of the stationary spatio-temporal sequence, a STARMA model prediction method is directly used, and the STARMA model prediction method comprises the following steps of:

(a1) establishing a STARMA model of the stationary spatio-temporal sequence, wherein, firstly, the STARMA model is established and identified: an objective function of the STARMA model is firstly established, and then autocorrelation and partial correlation functions of the STARMA model are used to perform model identification and determine a function order; secondly, model parameters of the STARMA model are estimated;

(a2) checking a residual of the STARMA model after the STARMA model is established; and (a3) estimating a precision of the predicted result of the model by using a root mean square error (RMS) and an average error (Bias);

in a case of the non-stationary spatio-temporal sequence, a ConvLSTM+STARMA hybrid model prediction method is used, which comprises the following steps of:

(b1) establishing a hybrid model comprising a model portion A and a model portion B, wherein firstly, the model portion A is to extract a spatial nonlinear trend of the non-stationary spatio-temporal sequences by using Convolutional Neural Networks, extract a temporal nonlinear trend of the non-stationary spatio-temporal sequence by using a LSTM neural network, and obtain a non-linear trend model of the non-stationary spatio-temporal sequence by the two extraction; secondly, a nonlinear trend in data is obtained using the model portion A, the nonlinear trend in the data is removed to obtain residual data, and a stationarity test is carried out on the obtained residual data; if the test fails, the model portion A is readjusted to extract the nonlinear trend again until the residual data pass the stationarity test; and thirdly, the model portion B is to perform STARMA modeling on stationary residual data if the test is passed;

(b2) performing a residual test on a fitting result of the hybrid model; and (b3) after passing the residual test, predicting the global ionospheric total electron content using the hybrid mode, and evaluating the prediction accuracy of the predicted result using the root mean square error (RMS) and average error (Bias).

2. The global ionospheric total electron content prediction system according to claim 1, wherein, preprocessing of original data and checking of stationarity of original electronic content data are performed before predicting the stationary spatio-temporal sequence;

the preprocessing of the original data is as follows: grid electron content observation data are used as the original data, and corresponding preprocessing is carried out in a preparation stage to judge whether there are abnormal data in the original data, and if so, the abnormal data need to be eliminated, because the abnormal data includes electron content values far exceeding a normal range caused by a low quality of original electron content data during calculation, and the abnormal data are atypical, rare and wrong calculated values, and will lead to deviation of results when participating in modeling;

the method used in the stationarity test of the original electron content data is to use a spatio-temporal covariance function of sample data for the stationarity test, and the formula of the stationarity test is as follows:

$$\gamma_{k+h} = \frac{1}{kh}\left[\sum_{i}^{h}\sum_{t}^{k}(z_i(t) - \mu_{z_i(t)})\right]\left[\sum_{i}^{h}\sum_{t}^{k}(z_{i+m}(t+k) - \mu_{z_i(t)})\right]$$

wherein, $r_{h+k}$ indicates a sample covariance function, $z_i(t)$ indicates a temporal sequence, $\mu_{z_i(t)}$ indicates a mean value of the temporal sequence, k is a time delay, and h is a space delay.

3. The global ionospheric total electron content prediction system according to claim 2, wherein, a criterion for the stationarity test is that when the time delay k and the space delay h take different values, if the obtained sample covariance remains unchanged or changes slowly, then the stationarity test is passed.

4. The global ionospheric total electron content prediction system according to claim 1, wherein the STARMA model prediction method specifically comprises the following steps of:

Step 1: establishing a stationary spatio-temporal sequence STARMA model;

wherein, after the stationarity test of the original electron content data, if it is confirmed to be a stationary spatio-temporal sequence, the STARMA model is used for modeling, and the specific steps of modeling are as follows:

(1) establishment and identification of the STARMA model: firstly, an objective function of that STARMA model is established, and the formula of the objective function is:

$$z(t) = \sum_{k=1}^{p}\sum_{h=0}^{m_k}\varphi_{kh}w^{(h)}z(t-k) - \sum_{l=1}^{q}\sum_{h=0}^{n_l}\theta_{kh}w^{(h)}\varepsilon(t-1) + \varepsilon(t)$$

wherein, z(t) is an observed value t=0, 1, 2, ... n at time t in an electron content sequence;

k=1, 2, ... p, which is the time delay;

h=0, 1, 2, ... n, which is the space delay;

$w^{(h)}$ is a spatial weight matrix of order h, which represents a quantitative measure of spatial proximity, in which case, a reciprocal of distance square is used as a weight value for measurement and a sum of each row of the weight matrix itself is standardized as 1, h=0, 1, 2, .. . n;

$\varphi_{kh}$ and $\theta_{kk}$ represent an autoregressive coefficient and a sliding coefficient respectively;

$\varepsilon(t)$ represents a white noise sequence with a mean value of zero and a variance of $\delta^2$, where t=0, 1, 2, ... n;

then, the autocorrelation and partial correlation functions of the STARMA model are used to perform model identification and determine the function order: on the one hand, q and p in STARMA model objective function formula are determined as time characteristics, and on the other hand, $m_k$ and $n_l$ in the STARMA model objective function formula are determined as space characteristics, and q, p, $m_k$ and $n_l$ are collectively referred to as an undetermined order; in time sequence analysis, memory characteristics of the time sequence are analyzed by using autocorrelation and partial correlation functions of the time sequence, and similarly, for the spatio-temporal sequence, a spatio-temporal sequence autocorrelation function is introduced, and the formula of the spatio-temporal sequence autocorrelation function is as follows:

$$\hat{\rho}_h(k) = \frac{T}{T-K}\frac{\sum_{i=1}^{N}\sum_{t=1}^{T-K}[w^{(h)}z_i(t)][w^{(0)}z_i(t+k)]}{\sqrt{\sum_{i=1}^{N}\sum_{t=1}^{T-k}[w^{(h)}z_i(t)]^2\sum_{i=1}^{N}\sum_{t=1}^{T-k}[w^{(0)}z_i(t)]^2}}$$

wherein, T is a total amount of samples; k is the time delay; h is the space delay;

$w^{(h)}$ is a spatial weight matrix with a space delay period of h, and a spatial weight matrix with a space delay of 0 when h=0 is a unit matrix, because every point in the space is its own neighborhood of order 0;

by analogy with the time sequence, a Yule-Walker equation is obtained by spatial autocorrelation function analysis, and the partial correlation function of spatio-temporal sequence is obtained by solving the equation; the Yule-Walker of the spatio-temporal sequence is as follows:

$$\hat{\rho}_h(k) = \sum_{t=1}^{p}\sum_{h=1}^{n_k}\phi_{kh}\hat{\rho}_{h-l}(t)$$

$\hat{\rho}_h(k)$ is a spatio-temporal autocorrelation coefficient, t is the time delay, h is the space delay, $\rho$ is a maximum time delay, $n_k$ is a maximum space delay of a sample when the time delay is k, $\phi_{kh}$ represents a spatio-temporal partial correlation function of the sample, l represents a delay value of 0, 1, 2, ... h, and the corresponding spatio-temporal partial correlation function is obtained by solving the above equations, and the correlation between $z_{i,h}(t)$ and $z_i(t\ k)$ is obtained by obtaining the partial correlation function $\phi_{kh}$;

by analyzing a tail or a truncation of the spatial autocorrelation and partial correlation functions on the data of electron content, a specific value of the undetermined order in the formula of the spatio-temporal sequence autocorrelation function is obtained;

(2) estimating the model parameters of the STARMA model:

$\varphi$, $\theta$ and $\delta$ in the objective function of the STARMA model are called as the model parameters, in view of the two dimensions of time and space involved in spatio-temporal sequence analysis, if a least square method is used to estimate the model parameters, parameter results obtained when estimating the sliding parameter are unbiased but not effective, therefore, a method of maximum likelihood estimation is chosen when estimating the model parameters;

assuming a random error term ε (0, σ² $I_{N\,T}$) in an original observation sequence of electron content, a parameter likelihood function in the spatio-temporal sequence of electron content is obtained b joint distribution of the error term, as shown in the following formula:

$$L(\varepsilon \mid \varphi, \theta, \sigma^2) = (2\pi)^{-TN/2}(\sigma^2)^{-TN/2}e^{\left(\frac{-s(\varphi,\theta)}{2\sigma^2}\right)}$$

wherein, $$s(\varphi, \theta) = \sum_{i=1}^{N}\sum_{t=1}^{T}\varepsilon_i(t)^2,$$

by transforming the above formula into a logarithmic form, and taking partial derivatives of φ, θ and δ respectively, a uniformly optimal unbiased estimation of the spatio-temporal sequence of electron content is obtained;

step two: checking a residual of the STARMA model after the model is established after the establishment of the STARMA model, a model suitable for the stationary spatio-temporal sequence is obtained, but it is still necessary to check whether the residual of the STARMA models is a random error, that is, whether a fitting residual of the model meets the requirements of a mean value of zero, a covariance of zero and a variance matrix of $δI_N$; if the above requirements are met, it shows that the STARMA model reflects the electron content data to a great extent; otherwise, there is still a certain correlation and variability in time and space, and non-stationary time-space sequence modeling is needed.

5. The global ionospheric total electron content prediction system according to claim 4, wherein the spatio-temporal sequence autocorrelation function measures the degree of correlation of a sample value corresponding to time t in an area formed by the time delay k and the space delay h, and a value range thereof is [−1, 1], and the closer the value is to 1, the higher the degree of correlation between time sequences of the samples.

6. The global ionospheric total electron content prediction system according to claim 1, wherein, the process of extracting the spatial nonlinear trend of the non-stationary spatio-temporal sequence by using Convolutional Neural Networks is as follows:

the spatial nonlinear trend of the global electron content sequence is extracted by a convolution neural network, which is composed of five basic structures: an input layer, a convolution layer, a pooling layer, a fully connected layer and an output layer;

as an input of the whole neural network, the input layer generally receives three-dimensional data input, which are longitude, latitude and electron content respectively, and three-dimensional data are transmitted between different layers of the convolutional neural network;

the convolution layer, as a core part of neural network processing, is mainly used for feature extraction of electronic content data; the convolution layer has three important parameters: convolution kernel size, convolution step size and filling mode, which play a decisive role in a size of a feature map output by the convolution layer; the convolution kernel size is related to complexity of spatial characteristics, the larger a convolution kernel, the more complex features are extracted; the convolution step size is similar to a spatial weight matrix of different orders, representing a distance between positions of input pictures processed by two adjacent convolution kernels; there are two filling modes: using filling and not using filling; the difference between the two different filling modes lies in that the size of an output picture changes after convolution, and complex characteristics are expressed by activation functions in the convolution layer; commonly used activation functions include a hyperbolic tangent function (tan h), an exponential linear unit; after convolution of input three-dimensional electron content data with a convolution kernel, a characteristic map of electron content distribution is obtained by the activation functions, and spatial characteristics are extracted in this process, and the spatial characteristics are used as a prediction basis;

the pooling layer accepts an output of the convolution layer, and continues to reduce a resolution of the feature map obtained by the convolution layer, which effectively reduces the parameters in the fully connected layer and prevent the occurrence of model overfitting;

the fully connected layer is located behind the convolution layer and the pooling layer, and after the input three-dimensional data passes through multiple convolution layers and pooling layers, low-order features of data spatial characteristics are gradually extracted, and high-order characteristics of data are obtained through combination, and then a final classification result is given by connecting with the fully connected layer;

the output layer takes different outputs according to different requirements, such as outputting classification labels for image classification and identifying a size and a category of an output object;

the specific process of extracting the temporal nonlinear trend of the non-stationary spatio-temporal sequence by a LSTM neural network is as follows:

the method of extracting the temporal nonlinear trend of a global electronic content sequence by using the LSTM neural network is characterized in that, a long-term observation data is efficiently used to extract the temporal nonlinear trend of the model, a structure of a "forgetting gate" is introduced into the LSTM neural network, and by setting a weight matrix of the "forgetting gate", an output of neurons at a previous moment and an input at a current moment collectively determine the information in the neurons at the last moment remains in the current neurons, which overcomes the shortcoming of poor learning effect of early data characteristics of general circulating neural networks; a common LSTM circulating neural network includes four layers of interactive neural networks, and the relationship between networks is expressed by the following formula:

$i_t \sigma(W_{xi}X_t W_{hi} h_{t-1} b_i)$ $f_t \sigma(W_{xf}X_t W_{hf} h_{t-1} b_f)$ $o_t$ $\sigma(W_{xo}X_t W_{ho}h_{t1}b_o)$ $=S \circ SS \circ SSShShS$ $h=S \circ SSSh$ wherein, $i_t$ represents a result of an input gate; $f_t$ represents a result of a forget gate; $o_f$ represents a result of an output gate; $S_t$ represents an output at the time T and also represents a long-term memory; $h_t$ represents a short-term memory, and W and b respectively represent different weight coefficients and offsets; extraction of the temporal nonlinear trend of electronic content by the LSTM neural network is embodied in that the input gate, the forget gate and the output gate will be collectively determined by an input state $X_t$ at the current moment and a state $S_{t-1}$ at the previous moment; use of the forget gate and the input gate determines retention and forgetting of information in the time sequence, and effectively preserves the long-term memory.

7. The global ionospheric total electron content prediction system according to claim 1, wherein, the step of estimating a precision of the predicted result of the model by using a root mean square error (RMS) and an average error (Bias) is specifically as follows:

in order to evaluate the prediction result, the average error (Bias) and the root mean square error (RMS) between a predicted value $VTEC^i_p$ and an actual observed value $VTEC^i_f$ are usually used for judgment by the following formula:

$$bais = \frac{1}{n}\sum_{i=1}^{n}(VTEC^i_p - VTEC^i_f)$$

$$RMS = \sqrt{\frac{\sum_{i=1}^{n}(VTEC^i_f - VTEC^i_r)^2}{n}}.$$

\* \* \* \* \*